United States Patent
Cetintas et al.

(10) Patent No.: US 11,436,628 B2
(45) Date of Patent: Sep. 6, 2022

(54) SYSTEM AND METHOD FOR AUTOMATED BIDDING USING DEEP NEURAL LANGUAGE MODELS

(71) Applicant: Yahoo Holdings, Inc., Sunnyvale, CA (US)

(72) Inventors: Suleyman Cetintas, Santa Clara, CA (US); Jian Yang, Palo Alto, CA (US); Ben Shahshahani, Menlo Park, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 853 days.

(21) Appl. No.: 15/789,452

(22) Filed: Oct. 20, 2017

(65) Prior Publication Data

US 2019/0122252 A1  Apr. 25, 2019

(51) Int. Cl.
*G06Q 30/02* (2012.01)
*G06N 3/08* (2006.01)

(52) U.S. Cl.
CPC .......... *G06Q 30/0242* (2013.01); *G06N 3/08* (2013.01); *G06Q 30/02* (2013.01); *G06Q 30/0277* (2013.01)

(58) Field of Classification Search
CPC ................................................. G06Q 30/0242
See application file for complete search history.

(56) References Cited

U.S. PATENT DOCUMENTS

| | | | |
|---|---|---|---|
| 8,417,807 B2 | 4/2013 | Malhotra et al. | |
| 2007/0022005 A1* | 1/2007 | Hanna | G06Q 30/02 705/14.1 |
| 2007/0061197 A1* | 3/2007 | Ramer | G06Q 30/02 705/14.64 |
| 2007/0256095 A1* | 11/2007 | Collins | G06Q 30/02 725/34 |
| 2009/0204551 A1* | 8/2009 | Wang | G06Q 30/0283 705/400 |

(Continued)

FOREIGN PATENT DOCUMENTS

WO    2014022272 A1    2/2014

OTHER PUBLICATIONS

C. Swapnil Sinha, "Right User, Right Time, Right Bid: How Smart Bidding Adds Efficiency and Saves Time", retrieved from https://www.thinkwithgoogle.com/intl/en-apac/marketing-strategies/search/smart-bidding/ (Year: 2017).*

(Continued)

*Primary Examiner* — Sam Refai
(74) *Attorney, Agent, or Firm* — Cooper Legal Group LLC

(57) ABSTRACT

Systems, devices, and methods are disclosed for predicting potential effectiveness of query-triggered internet advertisements received from different web page publishers using a deep learning neural network language model for clustering queries, and for automatically adjusting bids for advertisements by advertisers based on the predicted potential effectiveness. Using query-clusters rather than queries for adjusting bids for advertisements allows for more accurate and more consistent bidding strategy despite of sparsity in historical advertisement performance data, higher return on investments for the advertisers, and higher revenue for the publishers of the advertisements.

20 Claims, 6 Drawing Sheets

(56) References Cited

U.S. PATENT DOCUMENTS

| | | | |
|---|---|---|---|
| 2009/0319333 A1* | 12/2009 | Dangaltchev | G06Q 30/0249 705/7.29 |
| 2010/0138291 A1* | 6/2010 | Silverman | G06Q 30/02 705/14.45 |
| 2011/0040616 A1 | 2/2011 | Kannan et al. | |
| 2011/0040635 A1 | 2/2011 | Simmons et al. | |
| 2011/0225192 A1* | 9/2011 | Imig | G06F 16/9535 707/775 |
| 2011/0264519 A1 | 10/2011 | Chan et al. | |
| 2012/0215645 A1 | 8/2012 | Chung et al. | |
| 2012/0253927 A1* | 10/2012 | Qin | G06Q 30/0241 705/14.49 |
| 2014/0379473 A1* | 12/2014 | Zhou | G06Q 30/0256 705/14.54 |
| 2016/0104074 A1 | 4/2016 | Shekhawat et al. | |
| 2016/0189225 A1* | 6/2016 | Glover | G06Q 30/0257 705/14.55 |
| 2017/0061502 A1 | 3/2017 | Zhang et al. | |
| 2017/0132510 A1* | 5/2017 | Paluri | H04L 67/10 |
| 2017/0169465 A1* | 6/2017 | Capel | G06Q 30/0249 |
| 2017/0262878 A1 | 9/2017 | Cetintas et al. | |

OTHER PUBLICATIONS

EP Search Report cited in EP Application No. 18199716.4 dated Dec. 7, 2018, 10 pgs.

\* cited by examiner

SYSTEM AND METHOD FOR AUTOMATED BIDDING USING DEEP NEURAL LANGUAGE MODELS

BACKGROUND

Within a network system, a web server may host a web page that includes both web page content as well as a search tool linked to a search engine for searching the web page content. A user's communication device running a web browser application may access the web server directly to render the web page within the web browser application. The user may also access the web page after being redirected to the web page through a link included on another web page.

In addition to the web page content and search engine, some web pages are designed to include dedicated display areas or spaces for displaying information in the forms of, e.g., advertisements. Internet advertising has created a new venue, a new environment, and a new platform for advertisers to present more targeted and more cost effective advertisement campaigns to internet users who may not be exposed to other forms of advertisement outside of the internet.

DETAILED DESCRIPTION

Figure 1:
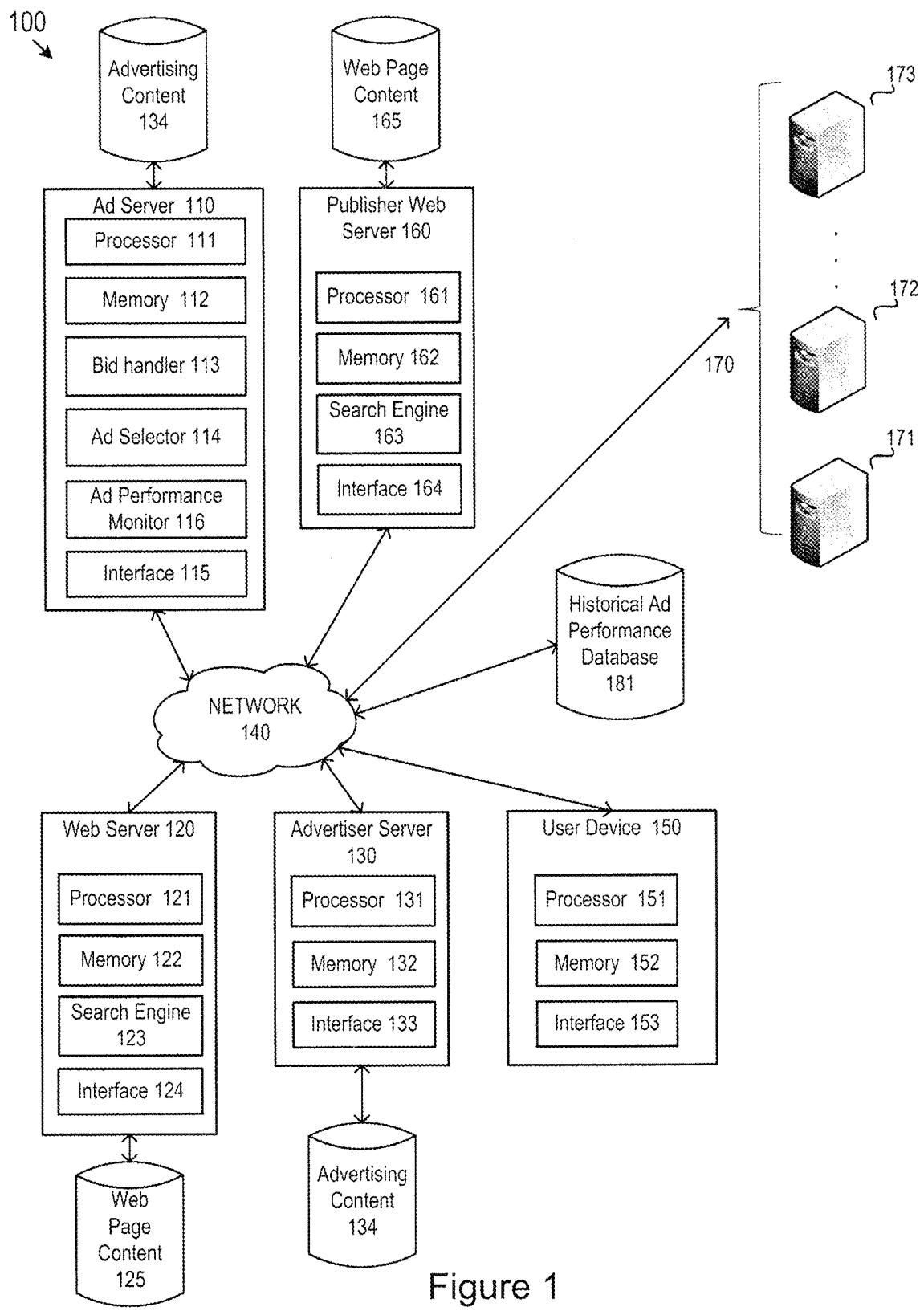
FIG. 1 illustrates a system diagram of an exemplary advertisement network system.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments, for example, may take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of ordinary skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

With the growing popularity of internet and mobile electronic devices, consumers are increasingly relying on web-based content for information. Accordingly, new internet-based advertisement network systems are created that take advantage of internet technology not previously available. Within the internet based advertisement network system, an advertiser is understood to generate and otherwise provide an internet advertisement that offers, for example, goods or services for sale. The internet advertisement, for example, may contain audio-visual content including but not limited to texts, still images, audio, and/or animations/videos. The advertiser may create, upload, and manage its advertisement contents to an advertisement content database and control rendering of the advertisement on a web page of, e.g., a publisher (or information publisher, as described below). The advertiser may maintain its own web pages (or have its web pages hosted) for its goods and services. The advertisement shown in the web page of a publisher may be hyperlinked to the advertiser's web page corresponding to the advertisement.

A publisher is understood to host a web page for receiving and displaying an advertiser's internet advertisement in addition to its web page content. For example, the publisher may display web content in its web page and at the same time reserve space in the form of one or more slots on the web page for displaying internet advertisements. The publisher may also access and control an ad server that selects the internet advertisement for display on the advertisement space on the publisher's web page based on a user's search query input to a search engine on the publisher's web page. An advertiser may agree to pay a cost-per-click (CPC) rate to the publisher for each click incurred on its internet advertisement published on the publisher's web page. Clicking on the internet advertisement may navigate a user to the advertiser's web page.

Publishers may further be distinguished between owned and operated publishers (OO publishers) and third party publishers. An OO publisher may control web servers that host major web page content providers (e.g., Yahoo) and associated web servers. The web pages associated to OO publishers may be specifically identified by advertisers for displaying their internet advertisements. On the other hand, third party publishers may not be directly associated with an OO publisher or advertiser. Rather, the third party publisher may include a search engine associated with the OO publisher (e.g., Yahoo search), and have an agreement with the OO publisher to display internet advertisements from a same database of internet advertisements available to the OO publisher, but may otherwise not be affiliated or controlled by the OO publisher. Even so, the third party publisher web page may select the same internet advertisements as the OO publisher web page based on the search query input into the same search engine. The OO publisher may then split CPC revenue with the third party publisher for clicks on internet advertisement displayed on the third party publisher's web page.

The publisher may further allow bidding for the advertisement space on its webpage by sending an electronic invitation to bid to ad server or other parties upon a user request (e.g., by the user typing in a search query in the publisher's web page). For example, the publisher may control the ad server to manage bidding from various advertisers and select an advertisement from an advertiser who is willing to pay the highest CPC rate. Alternatively, a second price auction model may be followed and as such, the highest bidding advertiser pays the second highest bidding CPC rate to the publisher for showing its advertisement.

The ad server may accordingly host a bidding platform. An advertiser may provide general guidelines beforehand to the ad server as to the bidding CPC rate that the advertiser is willing to accept for an advertisement. As will be described in more details below, the advertiser may further generally or particularly preauthorize the ad server to adjust the bid for showing an advertisement in a web page of a publisher based on potential effectiveness of the advertisement. The potential effectiveness of the advertisement, for example, may be estimated by the ad server based on a set of internet-centric dimensional information, e.g., attributes of the publisher, attributes of a user device visiting the publisher, attributes of the advertiser, and attributes of the inquiry that the user device inputs into the search engine of the publisher via the web page of the publisher and that triggers the ad server to identify an advertisement to show. The ad server may perform such estimation using historical performance records of advertisements by various advertisers on various publishers resulting from various queries by various user devices. The ad server may accordingly be further configured to maintain these historical performance records. According to some embodiments, the ad server may be part of a particular publisher's web server, and according to other embodiments the ad server may be a separate device in communication with the web server.

Historical performance of an advertisement maybe determined, for example, by whether it is converted after being clicked by a user. Particularly, by clicking on the advertiser's internet advertisement, the user may be directed to the advertiser's own web page that promotes the advertiser's goods or services. Once the user is navigated to the advertiser's web page after the clicking, a conversion on an advertiser offer may be accomplished by the user. A conversion may be understood to be one or more of, the user clicking on the internet advertisement, the user browsing the advertiser's web page for a predetermined length of time, the user inputting personal information (e.g., name, mailing address, phone number, or email address) through an information input field on the advertiser's web page, or the user actually buying a good or service offered by the advertiser on the advertiser's web page. Such conversions may be monitored and recorded by the ad server together with other attributes associated with the advertisements, such as attributes of the publisher, the advertiser, the search query leading to the display of the advertisement, and the user device from which the inquiry was made. A group of advertisements having same or similar attributes (dimensional information and advertiser information) maybe analyzed to provide a conversion rate. A conversion rate may further be normalized to analogous benchmark conversion rate to obtain a conversion rate ratio (CRR). The recorded CRR with attributes above provide the historical performance records of internet advertisements and may be maintained in a historical performance database. The derivation of CRR is described in more detail in U.S. patent application Ser. No. 15/064,310 by the same Applicant, which is incorporated by reference herein in its entirety.

However, because of sparsity of historical advertisement records having identical attributes above, there may not be sufficient number of records for a particular attribute combination to render any statistically significant prediction of potential performance of an advertisement. The search query attribute, in particular, is a vast dimension (having a large number of different search queries) and thus contributes the most to the data sparsity problem. As a result, query associated with an advertisement may not be found in the historical performance records.

The disclosure below solves the problem by employing data aggregation on the historical performance records according to at least the search query attribute. Particularly, the search queries may be clustered in a contextual and semantic sense based on deep learning techniques, e.g., a deep learning neural network language model that represents search queries in a dense vector space. As such, search queries that are within proximity to each other in the dense vector space may be classified as a same search query cluster and, essentially, a same search. When estimating a potential effectiveness of an advertisement having attributes including a search query, historical performance records aggregated according to the same search query cluster rather than the same search query may be used. As a result, potential effectiveness of significantly more advertisement traffic handled by the ad server may be estimated with reasonable accuracy, and bidding adjustment may be provided to significantly larger portion of the advertisement traffic.

FIG. 1 illustrates an exemplary system diagram of a network system 100 for providing bid adjustments of internet advertisements based on, at least, dimensional information of the advertisement traffic and deep learning techniques. The network system 100 includes an ad server 110, a user device 150, an advertiser server 130, advertising content repositories 134, webservers 120 and 160, webpage content repositories 125 and 165, a historical ad performance database 181, and a deep learning neural network model 170, communicating with one another via network 140.

The advertiser server 130 may comprise a processor 131, a memory 132, and a network interface 133 for accessing network 140. The advertiser server 130 may generate an advertiser's internet advertisement including advertisement content (e.g., audio-visual content) and a link (e.g., a hyperlink) to the advertiser's web page that is activated when a user clicks on the internet advertisement. The internet advertisements may be stored in the advertising content repository 134 that is in communication with the advertiser server 130. The advertiser server 130 may further control the network interface 133 to transmit internet advertisements to other devices and components within the network system 100 via the network 140.

The web server 120 of the network system 100 hosts one or more web pages corresponding to an OO publisher. The web server 120 may comprise a processor 121, a memory 122, a search engine 123, and a network interface 124 for accessing network 140. Web page content included on a web page hosted by the web server 120 may be stored on the web page content repository 125 in communication with the web server 120. The search engine 123 may receive a user's search query and search for related web page content in web page content repository 125. The web server 120 may select, from the web page content repository 125, web page content for display on a hosted web page based on the search results determined by the search engine 123. The web server 120 may also receive internet advertisements from ad server 110 to include in a rendering of a hosted web page.

The publisher web server 160 of the network system 100 may comprise a third party web server 160 that hosts one or more web pages corresponding to a third party publisher. The third party web server 160 may comprise a processor 161, a memory 162, a search engine 163, and a network interface 164 for accessing network 140. Web page content included on a web page hosted by third party web server 160 may be stored on the web page content repository 165 in communication with the third party web server 160. The search engine 163 may receive a user's search query and search for related web page content in the web page content repository 165. The third party web server 160 may select, from the web page content repository 165, web page content for display on a hosted web page based on the search results determined by the search engine 163. The third party web server 160 may also receive internet advertisements from ad server 110 to include in a rendering of a hosted web page. According to an embodiment, search engine 163 may be linked to search engine 123 such that the same logic is utilized to return search results to search queries input into both search engine 163 and search engine 123.

The communication device 150 in the network system 100 may comprise a processor 151, a memory 152, and a network interface 153 for accessing network 140. The communication device 150 may be for example, a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. Further, the communication device 150 may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. The communication device 150 may also include or execute an application to communicate content, such as, for example, textual content, multimedia content, or the like. The communication device 150 may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Figure 2:
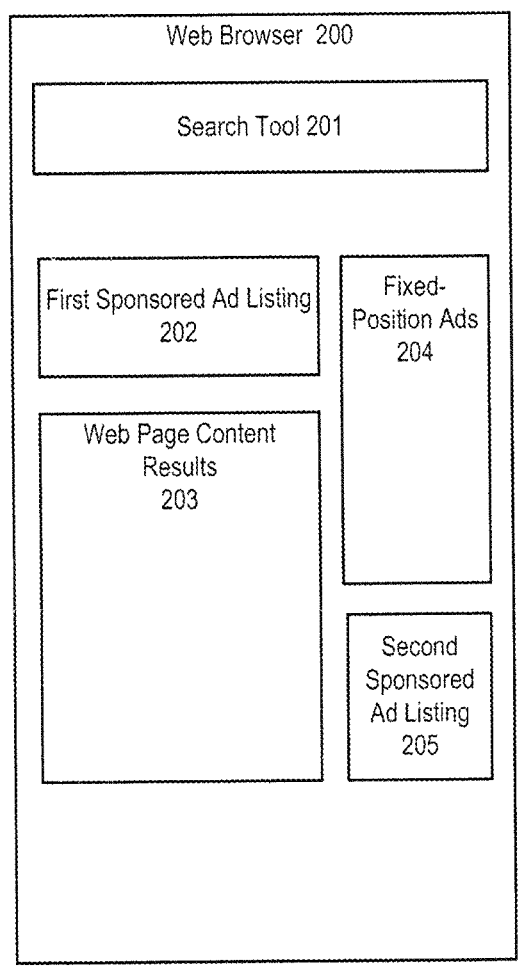
FIG. 2 illustrates an exemplary web browser interface displaying a web page.

For example, communication device 150 may run a web browser application for accessing a web page hosted by web server 120 or third party web server 160, and rendering web page content corresponding to the hosted web page within the web browser application. FIG. 2 illustrates an exemplary web browser 200 running on, for example communication device 150, and rendering a web page hosted by, for example, web server 120 or third party web server 160. The web page rendered by web browser 200 includes a search tool 201, where the search tool 201 may correspond to search engine 123 or search engine 163 included in web server 120 or third party web server 160, respectively. The web page further includes a first sponsored ad listing 202, fixed position ads 204, and a second sponsored ad listing 205. Each of the first sponsored ad listing 202, the fixed position ads 204, and the second sponsored ad listing 205 may be set aside for bid and ads may be bid-adjusted and selected by, for example, the bid handler 113 and ad selector 114 of the ad server 110 described below based on search input and/or search results analyzed by search engine 123 or search engine 163 included in web servers 120 or 160. The web page rendered by web browser 200 may further include web page content results 203, generated by, for example, search engine 123 or search engine 163, respectively, based on a search query input by the user into the search tool 201.

Returning to FIG. 1, the ad server 110 of the network system 100 may comprise a processor 111, a memory 112, a bid handler 113, an ad selector 114, an ad performance monitor 116, and a network interface 115 for accessing network 140. The ad server 110 may obtain dimensional information from the web server 120 or 160 when a search is made by a user (via, e.g., an invitation to bid). The ad server 110 may receive bidding advertisements from advertisers and select a winding advertisement to be displayed on the webpage hosted by web server 120 or 160 based on the received dimensional information and the information of the bidding advertisers.

In particular, the bid handler 113 of the ad server 110 may determine whether to adjust a bid from an advertiser based on a potential effectiveness of the bidding advertisement predicted using historical advertisement performance records, the dimensional information received from web server 120 or publisher web server 160, and the advertiser information. The dimensional information may include, for example, search query information (e.g. a user's search query input to search engine 123 or search engine 163), communication device attribute information (e.g., information identifying a device type of communication device 150), and/or publisher identification information (e.g., information identifying web server 120 or third party web server 160 as being associated with an OO publisher or a third party publisher or a particular publisher).

The historical ad performance records may be maintained in the historical ad performance database 181 in communication with the network 140 and accessed by the bid handler 113 of the ad server 110. A historical ad performance record may be maintained for tracking performance of displayed advertisements having a particular combination of dimensional information and advertiser information. The performance of the record may comprise a performance indicator, e.g., a conversion rate ratio (CRR). For example, the historical performance record may indicate that ads having the particular combination of dimensional information have historically provided a particular CRR. Accordingly, the ad server 110 may contain an ad performance monitor 116 to keep track of records of historical advertisements. In some implementations, the historical ad performance database 181 may be part of the ad server 110. In some other implementations, a dedicated server may be employed to perform the ad performance monitoring.

Figure 3:
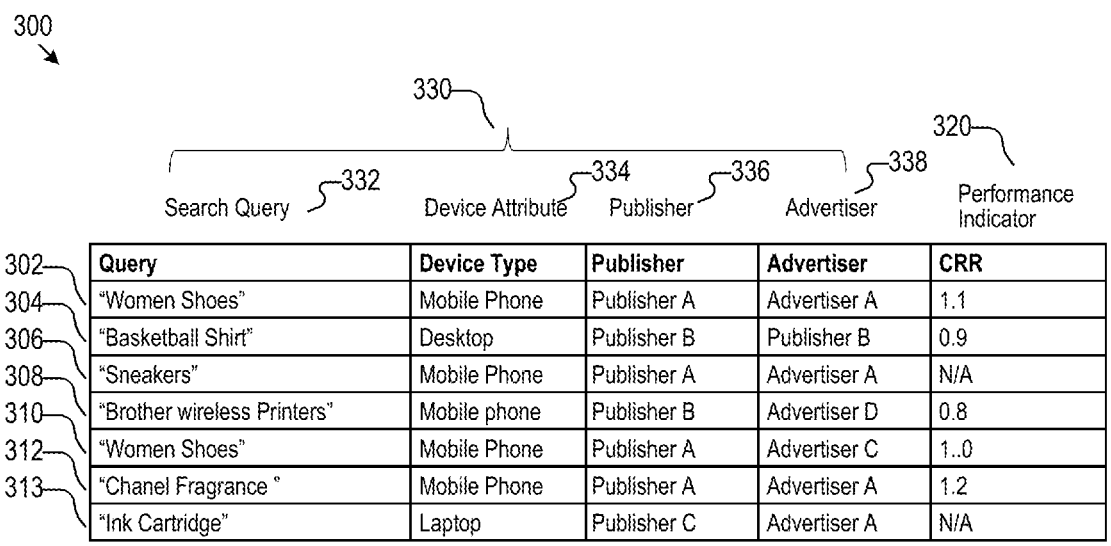
FIG. 3 illustrates example historical performance records of internet advertisements.

FIG. 3 illustrates an exemplary collection of historical performance records 300, including records 302, 304, 306, 308, 310, 312, and 314 each comprising a data field of performance indicator CRR 320 and dimensional information 430 including data fields of search query 332, device attribute 334, publisher information 336 and advertiser information 338. In one implementation, when historical CRR is not available or not statistically significant for a performance record of particular combination of dimensional information, such as record 406, the CRR field may be marked as "N/A". A historical CRR, for example, may be considered statistically insignificant if the number of historical ad clicks associated with the corresponding performance record is less than a predetermined number, e.g., 500. As such, the historical performance records 300 may be sparse as a large number of combinations of dimensional information may not correspond to a statistically significant CRR.

Returning to FIG. 1, the prediction of the potential effectiveness of a bidding advertisement may be obtained by the bid handler 113 of the ad server 110 by identifying from the historical ad performance database records having same or similar dimensional information as the bidding advertisement or some combination thereof and using the corresponding performance indicators of the identified historical advertisement records for the prediction. For example, when the bid handler 113 is preparing to determine an effectiveness prediction for a current click traffic resulting from search query A, received from publisher web page B, and where publisher web page B was accessed from communication device type C, the bid handler 113 may identify records in the historical ad performance database 181 (such as 300 of FIG. 3) having the same or similar search query A, publisher web page B and communication device type C. The bid handler 113 may then predict the potential effectiveness of the bidding advertisement based on the identified records and the corresponding historical performance indicators. As will be described in more detail below, such prediction process may involve query-clustering functions of the deep learning neural network model 170.

According to some embodiments, ad server 110 may be included as part of the web server 120, while in other embodiments ad server 110 may be a separate computing device as illustrated in FIG. 1. The ad server 110 may also be in communication with advertising content database 134 that stores internet advertisements. The internet advertisements stored on advertising content database 134 may have been received from advertiser server 130 through network interface 115 via the network 140.

The web page content and internet advertisements content described with reference to web server 120, third party web server 160, and ad server 110 may be integrated together before being delivered to the web browser application running on the communication device 150.

The neural network model 170 of FIG. 1 may be implemented by a plurality of server computers. For example, the neural network 170 may be implemented by server computers 171-173. The neural network 170 may be configured to apply deep learning techniques (e.g., query2vec and/or word2vec) to help group together known queries received by a networked search engine (e.g., search engine 123 and/or search engine 163) into query clusters. For example, a deep neural network language model 170 powered by computers 171-173 and trained on historical data may be utilized to learn high-quality vector representations of user search queries, and these representations can be used by standard clustering techniques (e.g., k-means, hierarchical clustering, etc.) to group similar user search queries into a predetermined number of query clusters. The grouping strategy implemented by the deep learning neural network language model 170 may consider creating a predetermined number of query clusters that optimizes the robustness of the search queries within each query cluster. To satisfy the creation of the predetermined number of query clusters, the neural network 170 may set a user search query similarity sensitivity level to group the queries into the predetermined number of query clusters (e.g., 1000 query clusters).

Figure 4:
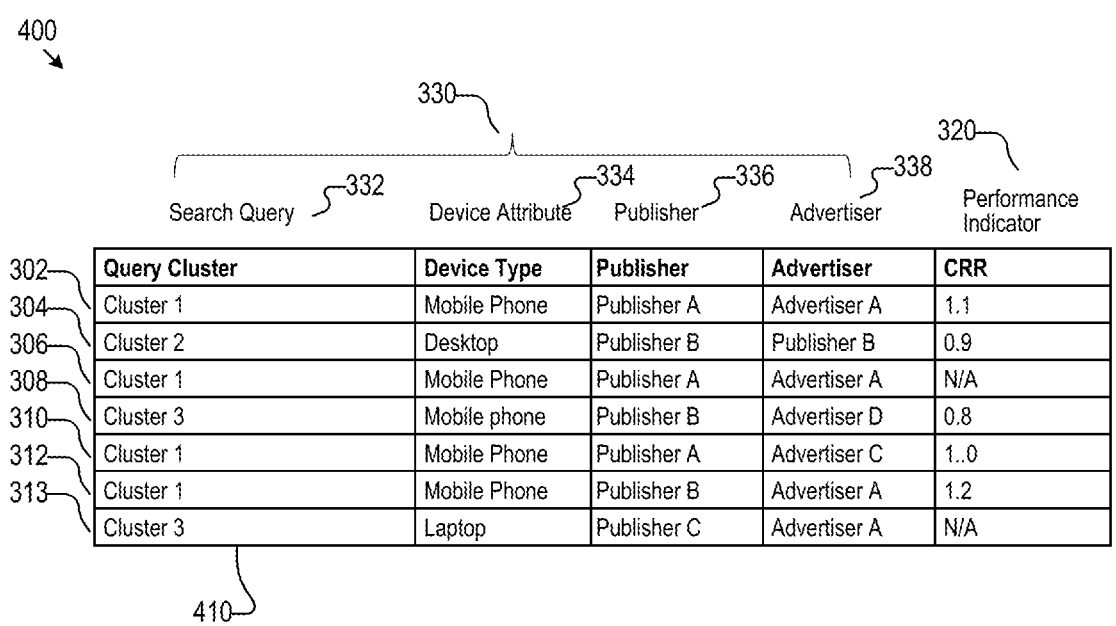
FIG. 4 illustrates example modified historical performance records of internet advertisement according to query clustering.

The historical performance records 300 of FIG. 3 may then be viewed in terms of query clusters rather than individual queries. In one implementation, as shown in FIG. 4, the search query information 332 of FIG. 3 may be replaced with query cluster information 410 to obtain modified historical performance records 400. The deep learning neural language model 170 self learns the high quality vector representation of user search queries and groups semantically similar queries based on contexts of words in the query together. For example, queries in records 302, 306, 310 and 312 may be clustered together (query cluster 1) because "women shoes" and "sneakers" are recognized as being referring to similar items in the vector representation, and "women shoes" and "Chanel fragrance" are recognized as both being related to women.

The deep learning neural network language model 170 may further be used to determine a query cluster for a biding advertisement. The resulting query cluster, in conjunction with the modified historical performance records 400 of FIG. 4, may be used by the bid handler 113 of the ad server 110 of FIG. 1 to obtain a prediction of effectiveness of the bidding advertisement even when the historical performance records 300 of FIG. 3 is sparse with respect to particular search query associated with the bidding advertisement.

Figure 5:
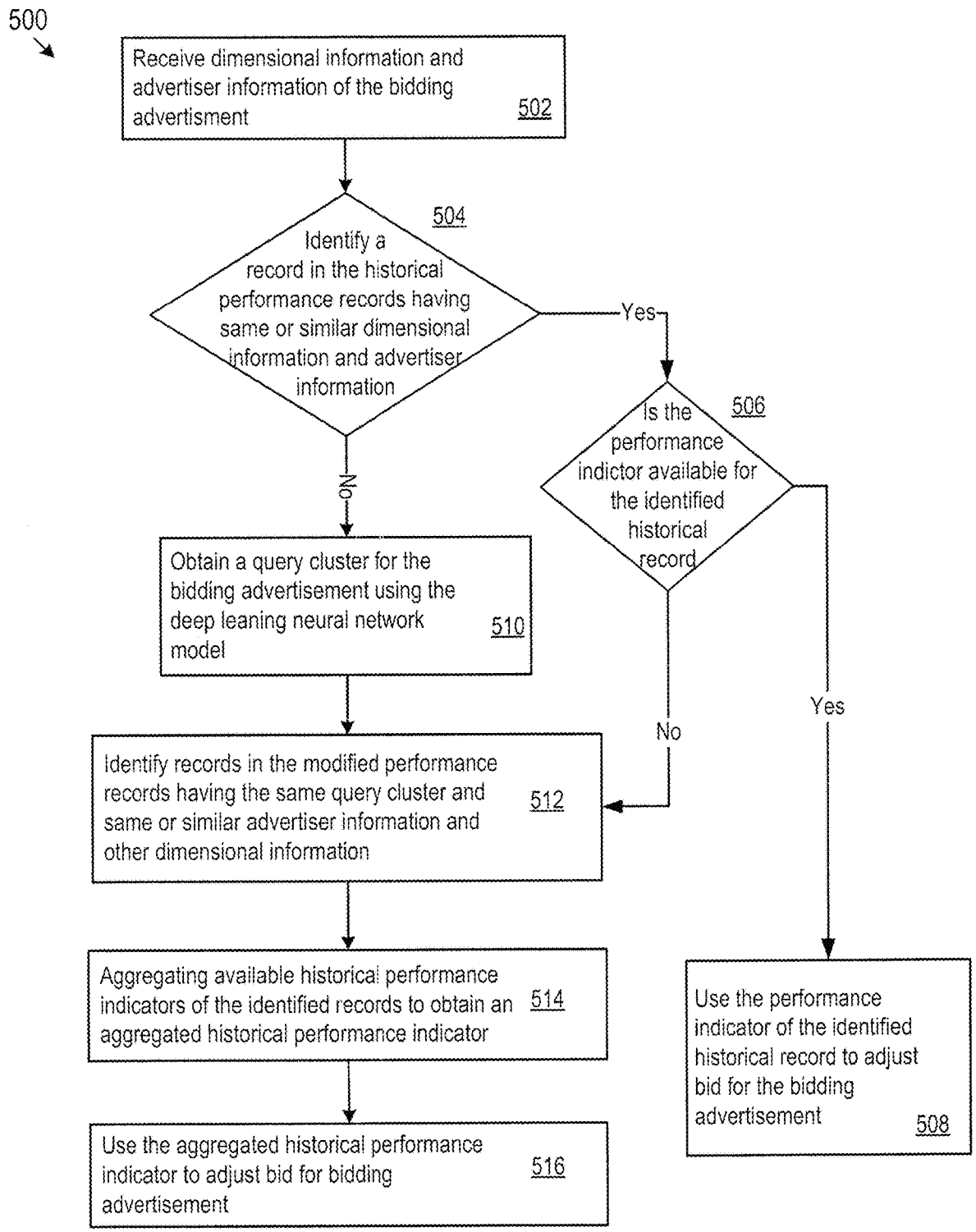
FIG. 5 illustrates an example logic flow for implementing prediction of potential effectiveness of an advertisement and provision of advertisement bidding suggestions.

FIG. 5 illustrates an exemplary logic flow that the bid handler 113 and ad selector 114 of the ad server 110 may follow. The ad server may receive dimensional information and advertiser information for a current advertisement (502). The ad server may access the historical performance database 181 to identify a historical performance record having same or similar dimensional information and advertiser information as the current bidding advertisement (504). If such record is identified, the ad server then determines whether a historical performance indicator is available for the identified historical performance record (506). If the historical performance indicator is available, the ad server may then use this historical performance indicator to adjust bid for the current bidding advertisement (508). If no record in the historical performance records is identified as having same or similar dimensional information and advertiser information as the bidding advertisement ("No" branch of 504) or such a record is identified but a corresponding historical performance indicator is unavailable ("No" branch of 506), the ad server may obtain a query cluster for the current bidding advertisement using the deep learning neural network model 170 (510) and identify records from the modified performance records 400 rather than the original performance records 300 for predicting potential effectiveness of the current bidding advertisement (512). In one implementation, the ad server may identify a group of records in the modified historical records 400 having the same query cluster, same or similar other dimensional information, and same advertiser information 512). The ad server may further aggregate the available performance indicators of the identified records (in 512) to obtain an aggregated historical performance indicator (514). The ad server then adjusts bid for the bidding advertisement based on the aggregated historical performance indicator (516).

The term "same or similar" above may be flexibly defined in the ad server. For example, the ad server may additionally use, e.g., fuzzy text matching techniques, to determine whether queries are the same or similar. As such, difference between queries due to, e.g., typos, may not result in the queries being considered as not the same or similar.

In one implementation, the ad server may not execute the "Yes" branch of 504, such that the prediction of the potential effectiveness and bid adjustment are only based on query cluster even when there is a historical performance record of exact match with the current bidding advisement. Such an approach uses more historical data for the prediction and thus in some cases, may provide better predictive accuracy.

Further, the prediction of the potential effectiveness of the bidding advertisement (512 and 514) may be made in a hierarchical manner. For example, one of the dimensional information and advertiser information may be omitted from consideration. Specifically, advertiser information, device information, publisher information, or any combination thereof may be omitted in step 512 and 514. As such, historical performance indictor data may be further aggregated according to those dimensions, and as a result, more historical data may be involved in the prediction. Similarly, some of the dimensional information and advertiser information may be omitted from consideration in logic flow step 504 and as such, the "Yes" branch of 504 may be implemented in a similar hierarchical manner.

An example is shown using the historical performance records 300 of FIG. 3 and the modified historical performance records 400 of FIG. 4. Assume that the current bidding advertisement have the following attributes: search query "neckless", device "mobile phone", publisher A, advertiser A. The ad server 110 identifies no exact or similar matches between the current bidding advertisement and the historical performance records 300. The ad server then use the deep learning neural network language model to determine that the search query of the current bidding advertisement, "neckless", belongs to query cluster 1. The ad server then accesses the modified historical performance records 400, and identifies records 302 and 306 as the same as or similar to the current bidding advertisement. Record 302 and 306 are thus aggregated to obtain an aggregated CRR of 1.1 (CRR for record 302 is 1.1, and N/A for 306). In the hierarchical implementation described above, the advertiser information may be omitted from consideration, and thus record 310 may be additionally included in the data aggregation and the aggregated CRR in this case may be 1.05 (e.g., average value for record 302 and 310).

The bid may be adjusted using the aggregated CRR. For example, if the aggregated CRR is 1.3, the originally proposed bid by the advertiser may be increased by 30%. The adjusted bid may then be used as a basis for the ad selector to select advertisement form other bidding advertisers. Permission to adjust bid may be preauthorized by the advertiser, or may be provided by the advertiser server in real time. Accordingly, the advertiser server may implement an automatic evaluation algorithm to analyze the proposed bid adjustment and permit or deny the bid adjustment in real time. For bidding advertisement that no suggested bidding adjustment can be made using the logic of FIG. 5 (if no matching records can be found in 504 and 512 or performance indictors are not available for records identified in 504 and 512), the ad server may proceed with the bid using the originally bid value given by the advertiser.

The solution of utilizing deep learning to group queries into query clusters helps generate more accurate bidding adjustment suggestions for substantially more search queries and substantially higher portions of traffic. In addition, query clustering using deep learning neural network language model rather than other natural language processing model helps capture complex linguistic, semantic, and contextual relationships, leading to better query clustering, more accurate and consistent bidding adjustments. More accurate and higher bids lead to higher conversion and higher return on investment (ROI) for the advertisers, and higher revenue for the publishers.

Returning to FIG. 1, Network 140 of the network system 100 may include any combination of long-haul and access networks. For example, network 140 may include a wireless network configured to couple communication device 150 with other client devices coupled to the wireless network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, the network 140 may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within the network 140, or the like.

Signal packets communicated via the network 140, which may include a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of the network 140, such as, for example, to one or more sites employing a local network address. A signal packet, for example, may be communicated over the Internet from a user site via an access node coupled to the Internet. Likewise, a signal packet may be forwarded via network nodes to a target site coupled to the network 140 via a network access node, for example. A signal packet communicated via the Internet may, for example, be routed via a path of gateways, servers, etc. that may route the signal packet in accordance with a target address and availability of a network path to the target address.

The network 140 may also include a "content delivery network" or "content distribution network" (CDN), where the CDN generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

The network 140 may also include a peer-to-peer (or P2P) network, where the P2P network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

With respect to the network 140, the network 140 may couple devices so that communications may be exchanged, such as between web server 120, third party web server 160, and communication device 150, or other devices within network system 100, including between wireless devices coupled via a wireless network, for example. The network 140 may also include mass storage, such as network attached storage (NAS), a storage area network (SAN), or other forms of computer or machine readable media, for example. The network 140 may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within the larger the network 140. Various types of devices, for example, may be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to the network 140, such as via a telephone line or link, for example.

Figure 6:
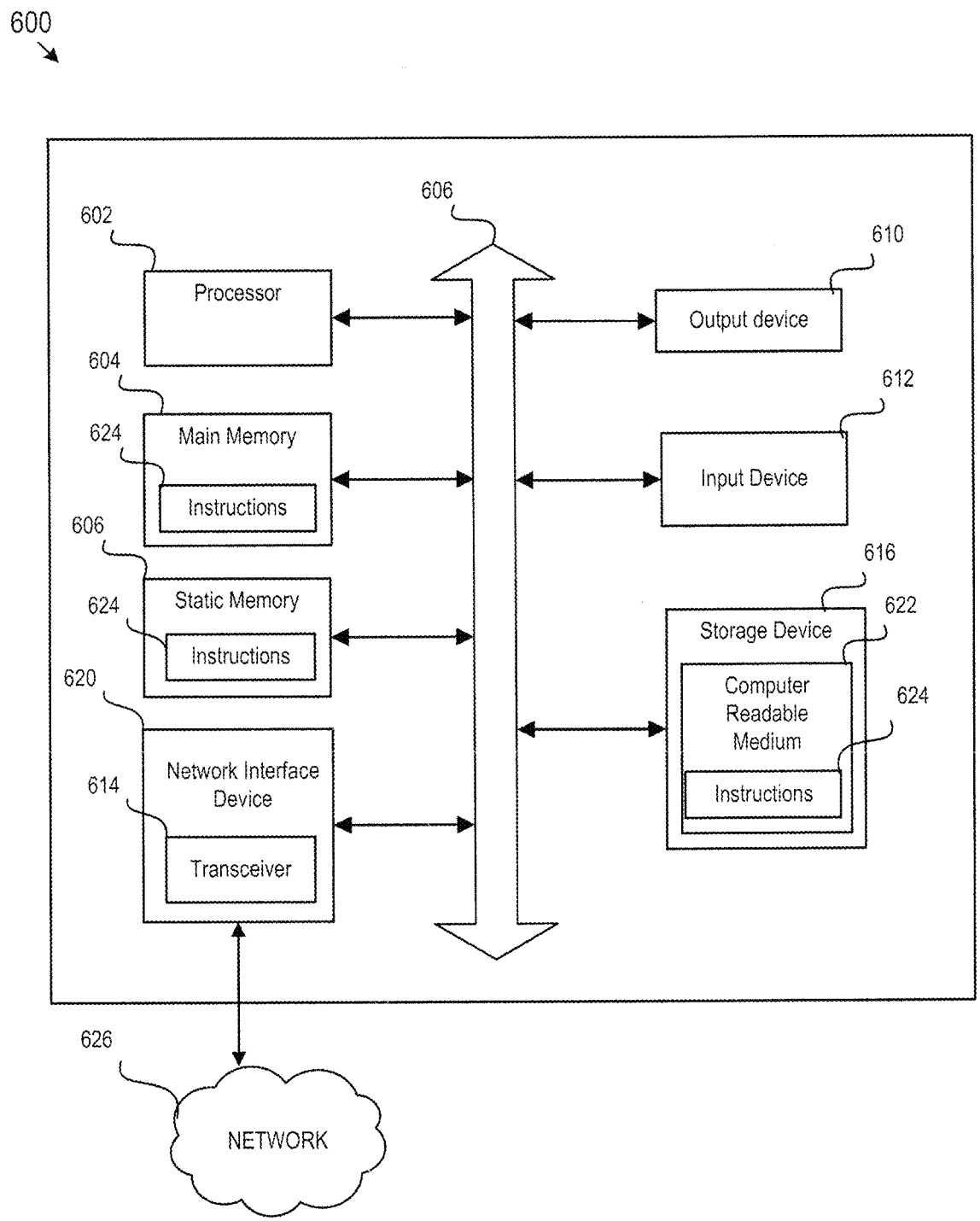
FIG. 6 illustrates a block diagram of exemplary computer architecture for one or more components included in the exemplary advertisement network system illustrated in FIG. 1.

FIG. 6 illustrates exemplary computer architecture for a computer 600. Embodiments of the computer 600, including embodiments that include additional components and embodiments including fewer components than described, may be representative of any one or more of the devices that comprise network system 100 illustrated in FIG. 1.

The computer 600 includes a network interface device 620 that enables communication with other computers via a network 626, where network 626 may be represented by the network 140 in FIG. 1. The computer 600 may include a processor 602, a main memory 604, a static memory 606, the network interface device 620, an output device 610 (e.g., a display or speaker), an input device 612, and a storage device 616, all connected via a bus 608.

The processor 602 represents a central processing unit of any type of architecture, such as a CISC (Complex Instruction Set Computing), RISC (Reduced Instruction Set Computing), VLIW (Very Long Instruction Word), or a hybrid architecture, although other appropriate processors may be used. The processor 602 executes instructions and includes portions of the computer 600 that control the operation of the entire computer 600. The processor 602 may also represent a controller that organizes data and program storage in memory and transfers data and other information between the various parts of the computer 600.

The processor 602 is configured to receive input data and/or user commands from the input device 612. The input device 612 may be a keyboard, mouse or other pointing device, trackball, scroll, button, touchpad, touch screen, keypad, microphone, speech recognition device, video recognition device, or any other appropriate mechanism for the user to input data to the computer 600 and control operation of the computer 600 and/or operation of the process steps and other features described herein. Although only one input device 612 is shown, in another embodiment any number and type of input devices may be included. For example, input device 612 may include an accelerometer, a gyroscope, and a global positioning system (GPS) transceiver.

The processor 602 may also communicate with other computers via the network 626 to receive instructions 624, where the processor may control the storage of such instructions 624 into any one or more of the main memory 604, such as random access memory (RAM), static memory 606, such as read only memory (ROM), and the storage device 616. The processor 602 may then read and execute the instructions 624 from any one or more of the main memory 604, static memory 606, or storage device 616. The instructions 624 may also be stored onto any one or more of the main memory 604, static memory 606, or storage device 616 through other sources. The instructions 624 may correspond to, for example, instructions that represent the pricing generator 113 described herein.

Although computer 600 is shown to contain only a single processor 602 and a single bus 608, the disclosed embodiment applies equally to computers that may have multiple processors and to computers that may have multiple busses with some or all performing different functions in different ways.

The storage device 616 represents one or more mechanisms for storing data. For example, the storage device 616 may include a computer readable medium 622 such as read-only memory (ROM), RAM, non-volatile storage media, optical storage media, flash memory devices, and/or other machine-readable media. In other embodiments, any appropriate type of storage device may be used. Although only one storage device 616 is shown, multiple storage devices and multiple types of storage devices may be present. Further, although the computer 600 is drawn to contain the storage device 616, it may be distributed across other computers, for example on a server.

The storage device 616 may include a controller (not shown) and a computer readable medium 622 having instructions 624 capable of being executed by the processor 602 to carry out processes described herein. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 616 may also contain additional software and data (not shown), which is not necessary to understand the features described herein.

Output device 610 is configured to present information to the user. For example, the output device 610 may be a display such as a liquid crystal display (LCD), a gas or plasma-based flat-panel display, or a traditional cathode-ray tube (CRT) display or other well-known type of display in the art of computer hardware. Accordingly, in some embodiments the output device 610 displays a user interface. In other embodiments, the output device 610 may be a speaker configured to output audible information to the user. In still other embodiments, any combination of output devices may be represented by the output device 610.

Network interface device 620 provides the computer 600 with connectivity to the network 626 through any suitable communications protocol. The network interface device 620 sends and/or receives data from the network 626 via a wireless or wired transceiver 614. The transceiver 614 may be a cellular frequency, radio frequency (RF), infrared (IR) or any of a number of known wireless or wired transmission systems capable of communicating with the network 626 or other computer device having some or all of the features of computer 600. Bus 208 may represent one or more busses, e.g., USB, PCI, ISA (Industry Standard Architecture), X-Bus, EISA (Extended Industry Standard Architecture), or any other appropriate bus and/or bridge (also called a bus controller).

The computer 600 may be implemented using any suitable hardware and/or software, such as a personal computer or other electronic computing device. In addition to the various types of wearable devices described herein, the computer 600 may also be a portable computer, laptop, tablet or notebook computer, PDA, pocket computer, appliance, telephone, or mainframe computer.

The disclosed method and system may be implemented partly in a server, a client device, a cloud computing environment, partially in a server and partially in a client device, or a combination of the server, the cloud computing environment and the client device.

It is therefore intended that the foregoing detailed description be regarded as illustrative rather than limiting, and that it be understood that it is the following claims, including all equivalents, that are intended to define the spirit and scope of this disclosure.

What is claimed is:

1. A server, comprising:
 a network interface configured to:
  receive, from an information-publishing server, an invitation to bid for an advertisement space according to a query received at the information-publishing server from a requester; and
  receive, from an advertiser, a bid in response to the query and the invitation to bid; and
 a processor in communication with the network interface, configured to:
  determine a query cluster, comprising a plurality of search queries, for the query among a predefined set of query clusters using a trained query-clustering neural network, wherein the predefined set of query clusters comprises a first query cluster comprising a first plurality of search queries and a second query cluster comprising a second plurality of search queries;
  aggregate historical performance records of query-based advertisements, to obtain aggregated historical performance records, according to the query cluster, comprising the plurality of search queries, as determined by the trained query-clustering neural network;
  predict an effectiveness measure of the advertisement space with respect to the query for the advertiser based on the aggregated historical performance records associated with two or more search queries and obtained by the aggregating according to the query cluster, comprising the plurality of search queries, determined for the query associated with the advertisement space; and
  automatically control an adjustment to the bid received from the advertiser to obtain an adjusted bid according to the effectiveness measure.

2. The server of claim 1, wherein the historical performance records of query-based advertisements includes:
 a query field specifying queries corresponding to the query-based advertisements;
 a device type field specifying types of querying devices corresponding to the query-based advertisements;
 a publisher field identifying publishers of the query-based advertisements;
 an advertiser field identifying advertisers corresponding to the query-based advertisements; and
 a performance indicator field specifying performance indicators corresponding to the query-based advertisements.

3. The server of claim 2, wherein the performance indicators of the query-based advertisements correspond to conversion rate ratios between rates of conversion of the query-based advertisements and benchmark rates of conversion.

4. The server of claim 3,
 wherein a conversion corresponds to a querying device browsing a web page associated with a query-based advertisement for a predetermined length of time, the querying device inputting information to the web page, or a purchase by the querying device being recorded on the web page; and
 wherein the rates of conversion correspond to numbers of conversion for the query-based advertisements normalized to numbers of browses of the query-based advertisements.

5. The server of claim 2, wherein the processor is configured to aggregate the historical performance records to obtain the aggregated historical performance records by:
 converting the query field to a query cluster field using the trained query-clustering neural network; and aggregating one or more performance indicators of one or more historical performance records having an identical query cluster field, an identical device type field, an identical publisher field, and an identical advertiser field to obtain the aggregated historical performance records.

6. The server of claim 5, wherein the processor is configured to predict the effectiveness measure of the advertisement space with respect to the query for the advertiser by:
identifying a record from the aggregated historical performance records having at least one of a query cluster field, a publisher field, an advertiser field, or a device type field that respectively match the query cluster, the information-publishing server, the advertiser, and a device type for the requester; and
predicting the effectiveness measure of the advertisement space with respect to the query for the advertiser based on the one or more performance indicators of the record.

7. The server of claim 2, wherein the processor is configured to aggregate the historical performance records to obtain the aggregated historical performance records by:
converting the query field to a query cluster field using the trained query-clustering neural network; and
aggregating one or more performance indicators of one or more historical performance records having identical query cluster field, an identical device type field, and an identical publisher field to obtain the aggregated historical performance records.

8. The server of claim 2, wherein the processor is configured to aggregate the historical performance records to obtain the aggregated historical performance records by:
converting the query field to a query cluster field using the trained query-clustering neural network; and
aggregating one or more performance indicators of one or more historical performance records having an identical query cluster field, an identical device type field, and an identical advertiser field to obtain the aggregated historical performance records.

9. The server of claim 2, wherein the processor is configured to aggregate the historical performance records to obtain the aggregated historical performance records by:
converting the query field to a query cluster field using the trained query-clustering neural network; and
aggregating one or more performance indicators of one or more historical performance records having an identical query cluster field and an identical device type field to obtain the aggregated historical performance records.

10. The server of claim 1, wherein the trained query-clustering neural network is configured to convert queries into vector representations.

11. The server of claim 10, wherein the trained query-clustering neural network is configured to cluster the queries based on clustering the vector representations, wherein the clustering comprises (i) clustering a first query with a second query into the first query cluster based on a similarity between the first query and the second query in the vector representations and (ii) clustering a third query and a fourth query into the second query cluster based on a similarity between the third query and the fourth query in the vector representations.

12. The server of claim 11, wherein the trained query-clustering neural network is configured to perform the clustering based on a user search query similarity sensitivity level associated with grouping queries into a predetermined number of query clusters.

13. A method, comprising:
receiving, from an information-publishing server, an invitation to bid for an advertisement space according to a query received at the information-publishing server from a requester;
receiving, from an advertiser, a bid in response to the query and the invitation to bid;
determining a query cluster, comprising a plurality of search queries, for the query among a predefined set of query clusters using a trained query-clustering neural network, wherein the predefined set of query clusters comprises a first query cluster comprising a first plurality of search queries and a second query cluster comprising a second plurality of search queries;
aggregating historical performance records of query-based advertisements to obtain aggregated historical performance records according to at least query clusters as determined by the trained query-clustering neural network;
predicting an effectiveness measure of the advertisement space with respect to the query for the advertiser based on the query cluster, comprising the plurality of search queries, and the aggregated historical performance records; and
automatically controlling an adjustment to the bid received from the advertiser to obtain an adjusted bid according to the effectiveness measure.

14. The method of claim 13, wherein the historical performance records of query-based advertisements includes:
a query field specifying queries corresponding to the query-based advertisements;
a device type field specifying types of querying devices corresponding to the query-based advertisements;
a publisher field identifying publishers of the query-based advertisements;
an advertiser field identifying advertisers corresponding to the query-based advertisements; and
a performance indicator field specifying performance indicators corresponding to the query-based advertisements.

15. The method of claim 14, wherein the performance indicators of the query-based advertisements correspond to conversion rate ratios between rates of conversion of the query-based advertisements and benchmark rates of conversion.

16. The method of claim 15,
wherein a conversion corresponds to a querying device browsing a web page associated with a query-based advertisement for a predetermined length of time, the querying device inputting information to the web page, or a purchase by the querying device being recorded on the web page; and
wherein the rates of conversion correspond to numbers of conversion for the query-based advertisements normalized to numbers of browses of the query-based advertisements.

17. The method of claim 14, wherein aggregating the historical performance records to obtain the aggregated historical performance records comprises:
converting the query field to a query cluster field using the trained query-clustering neural network; and
aggregating one or more performance indicators of one or more historical performance records having an identical query cluster field, an identical device type field, an identical publisher field, and an identical advertiser field to obtain the aggregated historical performance records.

18. The method of claim 17, wherein predicting the effectiveness measure of the advertisement space with respect to the query for the advertiser comprises:
identifying a record from the aggregated historical performance records having at least one of a query cluster field, a publisher field, an advertiser field, or a device type field that respectively match the query cluster, the information-publishing server, the advertiser, and a device type for the requester; and
predicting the effectiveness measure of the advertisement space with respect to the query for the advertiser based on the one or more performance indicators of the record.

19. A system, comprising:
a query-clustering server configured to implement a trained query-clustering neural network; and
an advertising server comprising:
a database for storing historical performance records of query-based advertisements;
a network interface configured to:
receive, from an information-publishing server, an invitation to bid for an advertisement space according to a query received at the information-publishing server from a requester;
receive, from an advertiser, a bid in response to the query and the invitation to bid;
send the query to the query-clustering server for determining a query cluster for the query using the trained query-clustering neural network, wherein the query cluster comprises a plurality of search queries; and
receive from the query-clustering server the query cluster, comprising the plurality of search queries, for the query; and
a processor in communication with the network interface, configured to:
obtain the historical performance records of query-based advertisements from the database;
aggregate the historical performance records of query-based advertisements to obtain aggregated historical performance records according to at least query clusters as determined by the trained query-clustering neural network of the query-clustering server;
predict an effectiveness measure of the advertisement space with respect to the query for the advertiser based on the query cluster, comprising the plurality of search queries, and the aggregated historical performance records; and
automatically control an adjustment to the bid received from the advertiser to obtain an adjusted bid according to the effectiveness measure.

20. The system of claim 19,
wherein the historical performance records of query-based advertisements include a query field specifying queries corresponding to one or more query-based advertisements, a performance indicator field specifying performance indicators corresponding to the one or more query-based advertisements, and at least a third field; and
wherein the processor is configured to aggregate the historical performance records to obtain the aggregated historical performance records by:
converting the query field to a query cluster field using the trained query-clustering neural network; and
aggregating one or more performance indicators of one or more historical performance records having an identical query cluster field and the third field to obtain the aggregated historical performance records.

* * * * *